Patented Sept. 1, 1936

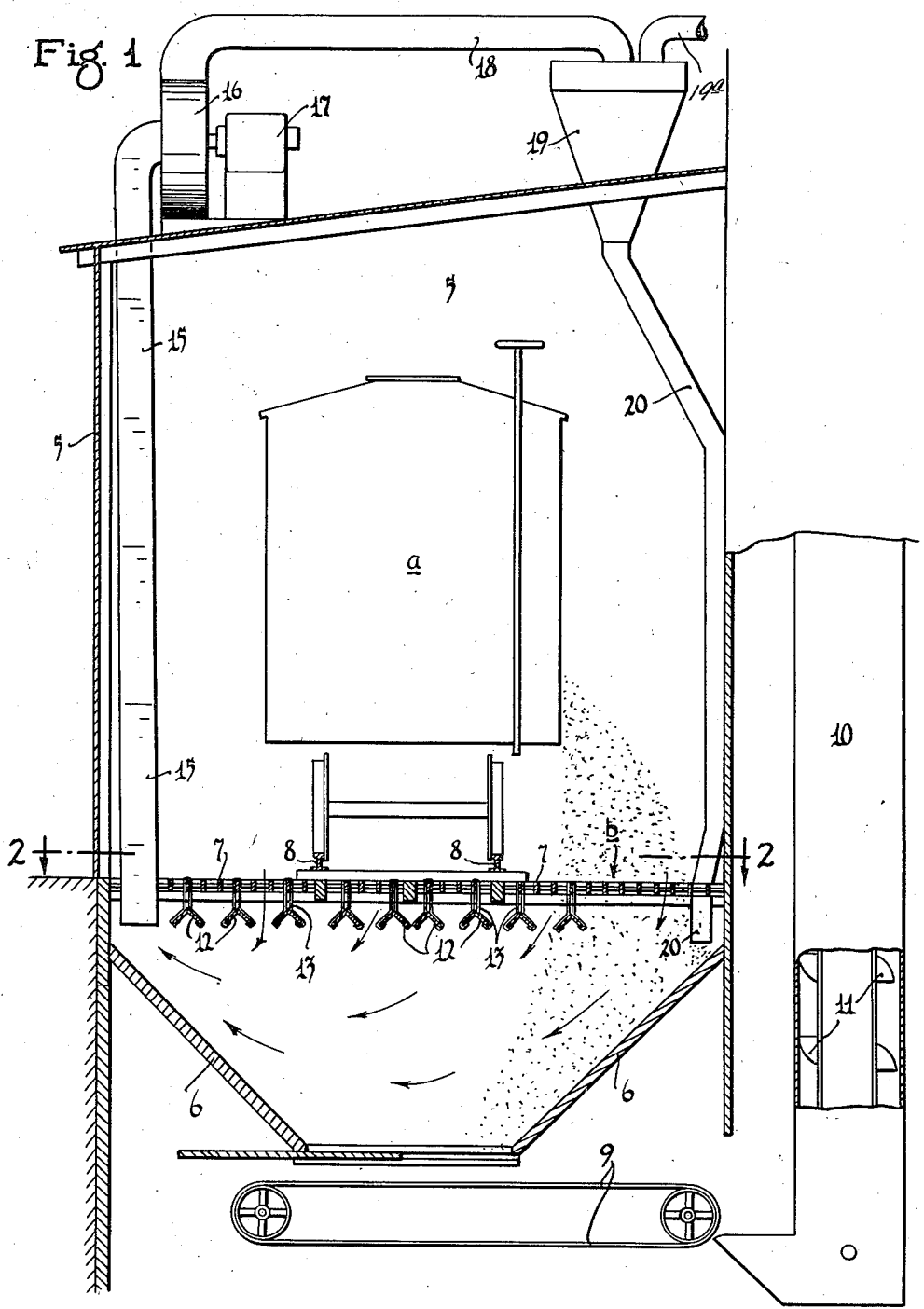

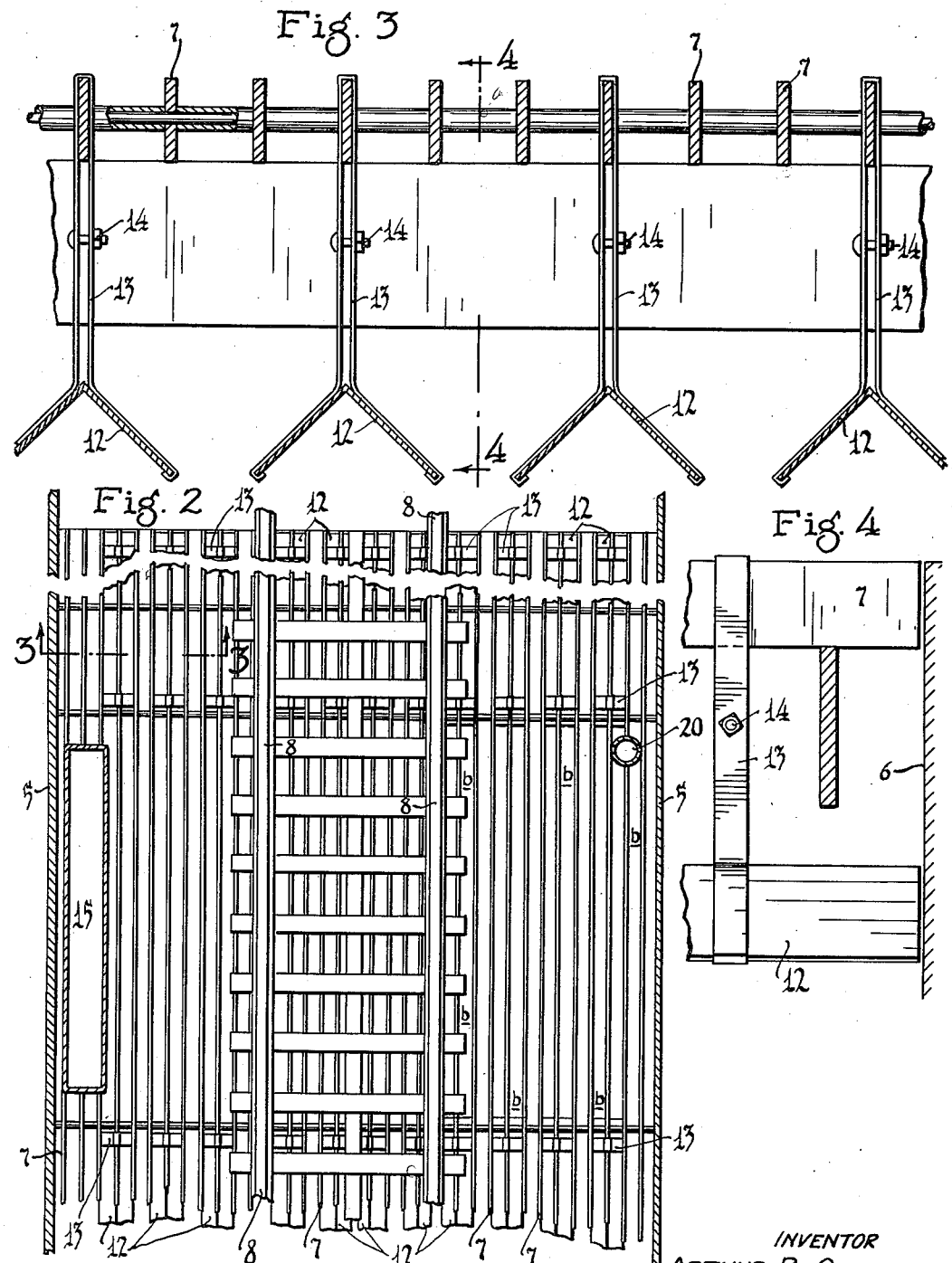

2,052,646

UNITED STATES PATENT OFFICE 2,052,646

TRACK SHED DUST COLLECTING SYSTEM

Arthur B. Osgood, Minneapolis, Minn.

Application February 15, 1935, Serial No. 6,655

5 Claims. (Cl. 209—134)

My invention provides what is herein designated as a track shed dust-collecting system, and generally stated, consists of the novel devices and combinations of devices hereinafter described and defined in the claims. More specifically stated, the invention relates to grain storage houses or elevators wherein grain is unloaded from cars through a grating and into an underlying receiving hopper or pit, from which latter the grain will be elevated and delivered either to cars or to vehicles; and the invention provides simple and efficient means for preventing dust or like foreign materials (usually designated as dockage) from being blown or carried by air currents through the grating and into the unloading room or compartment.

It is a well known fact that grain contains a certain amount of dockage, which, in the handling of the grain through a grain storage building or elevator, should remain commingled with the grain and which, to prevent loss to the owner of the grain, should not be permanently removed. It is also a known fact that in the discharge of grain from cars, through the grating overlying the receiving hopper, air currents are usually produced which carry more or less of the dockage, particularly the lighter portions thereof, up through the grating and into the unloading rooms, and which is not returned to the body of grain but becomes a nuisance in that it will be deposited over various articles within the unloading room or blown into the atmosphere.

My invention provides in connection with these unloading rooms or compartments and in connection with the receiving hoppers or pits, air controlling devices wherein all the dust or dockage will be carried through the grating and into the receiving hopper and the lighter portions such as dust, will be picked up by controlled air current, separated from the air and returned into the receiving hopper and there commingled with the grain.

In the accompanying drawings, which illustrate the invention applied as above generally indicated, like characters indicate like parts throughout the several views.

Referring to the drawings:

Fig. 1 is a transverse vertical section illustrating the invention applied as above described to the unloading room or compartment of a grain storage building or grain elevator;

Fig. 2 is a horizontal section with some parts broken away taken on the line 2—2 of Fig. 1;

Fig. 3 is a fragmentary enlarged transverse section taken on the line 3—3 of Fig. 2; and Fig. 4 is a fragmentary vertical section taken on the line 4—4 of Fig. 3.

Of the parts of the grain storage or elevator structure, the numeral 5 indicates the unloading room or compartment, the numeral 6, the receiving hopper or pit, the numeral 7 the grating that overlies the hopper, the numeral 8 the car rails, the numeral 9 the travelling conveyor that overlies the open bottom of the hopper 6, and the numeral 10 the elevator boot in which works the customary bucket-equipped elevator belt 11.

In Fig. 1, a freight car is indicated diagrammatically by the character a. To reduce the area below the grate to a minimum, without detrimentally obstructing flow of grain through the grating into the receiving hopper, I provide a plurality of parallel deflecting bars 12 preferably made inverted V-shaped in cross-section. These bars are supported just below the grating and spaced substantially as shown, by means of hangers 13 that are applied to said bars 12 and the overlying bars of the grating 7. Preferably, these hangers are each made from a single piece of flat or strap metal bent to embrace and depend from the overlying bars of the grating, as best shown in Fig. 3, and the lower portions of these straps are bent to fit the upper surfaces of the co-operating deflector bars and their extreme lower ends are bent to fit around the lower edges of said bars 12. Nut-equipped bolts 14 passed through the intermediate portions of the parallel legs of the hangers 13 hold the lower ends thereof interlocked to said deflector bars. These deflector bars 12 are disposed under the major area of the grating and are preferably omitted in a small area b, see Fig. 2, at one side of the intermediate portion of the track, so that when grain is rapidly discharged in great volume from the car, it will flow very freely through the grating into the receiving pit.

An air suction spout 15 is extended from a point below the grating preferably at that side that is remote from the open grate area b and is carried to a suitable point (as shown, above the roof of the unloading room 5) where it is connected to the intake of a suction fan 16 driven by suitable means such as an electric motor 17. The discharge passage of the fan 16 is connected by a tube or spout 18 to a dust collector 19, which also is supported in any suitable way but is shown as supported by the roof of the unloading room. The dust collector 19, in its top, has the usual or any suitable air outlet 19a leading to the atmosphere for the discharge of clean air, but for the discharge of the precipitated dust or dockage, it is provided with a depending spout 20 which leads downward and discharges the dust or dockage back into the receiving hopper. Preferably, the delivery end of the return spout 20 is extended through the grate area b and is positioned to deliver the dockage back into the flowing stream of grain discharged from the freight car.

By the above arrangement, the open area through the grating or above the receiving hopper is so reduced that by a comparatively mild forced circulation of air to the fan and dust collector, a mild downward draft will be produced through the entire grating that prevents the upward movement or rising of the dust. This air draft must be somewhat greater than sufficient to compensate for displacement of the air by the inflowing grain and will be sufficient to carry the dust or light portion of the dockage to the dust collector and back into the receiving hopper as described.

When grain is discharged in bulk from freight cars, its flow into the hopper will be very rapid and thus discharge is best effected through the open area b. When the grain is discharged from the car or vehicle from opened sacks, it will flow freely through the passages between the deflecting bars 12. The arrangement described can be installed at comparatively small cost and not only eliminates the dust nuisance that would otherwise occur, but properly restores the dockage to the grain.

What I claim is:

1. The combination with a grating affording an unloading runway and a receiving pit below the same, of spaced deflectors located under a considerable portion of said grating and restricting the flow of air therethrough, a suction spout leading from said pit, means for producing a flow of dust-laden air from said pit through said suction pipe, means for separating the air and the dust particles, and means for returning the dust to said pit.

2. The combination with a grating and a track thereon, of a receiving pit below said grating, a dust-collector, and a fan having an intake spout leading from said pit and having an outlet spout leading to said dust-collector, said dust-collector having a dust discharge spout leading back into said pit, spaced deflectors located under the major portion of said grating and restricting the flow of air downward through said grating in the zone where they are applied.

3. The combination with a grating and a track thereon, of a receiving pit below said grating, a dust-collector, and a fan having an intake spout leading from said pit and having an outlet spout leading to said dust-collector, said dust-collector having a dust discharge spout leading back into said pit, spaced deflectors located under the major portion of said grating and restricting the flow of air downward through said grating in the zone where they are applied, said suction spout leading from one side of said pit and said dust return spout leading back to the other side thereof.

4. The combination with a grating and a track thereon, of a receiving pit below said grating, a dust-collector, and a fan having an intake spout leading from said pit and having an outlet spout leading to said dust-collector, said dust-collector having a dust discharge spout leading back into said pit, spaced deflectors located under the major portion of said grating and restricting the flow of air downward through said grating in the zone where they are applied, said suction spout leading from one side of said pit and said dust return spout leading back to the other side thereof, the said deflectors being omitted from a limited zone adjacent to the delivery end of said dust return spout for the freer flow of grain through that portion of the grating.

5. The combination with a grating affording a track or runway and having parallel spaced bars, of deflectors located below said grating, said deflectors being bars of inverted V-shaped cross-section, and hanger straps hung on certain of the bars of said grating and having ends embracing and interlocked to the downturned edges of said deflector bars.

ARTHUR B. OSGOOD.